Aug. 27, 1957 E. A. NEUGASS 2,804,041
INSTRUMENT INDICATOR
Filed May 27, 1954 4 Sheets-Sheet 1

INVENTOR
EDWIN A. NEUGASS
BY
ATTORNEY

Aug. 27, 1957
E. A. NEUGASS
2,804,041
INSTRUMENT INDICATOR
Filed May 27, 1954
4 Sheets-Sheet 2
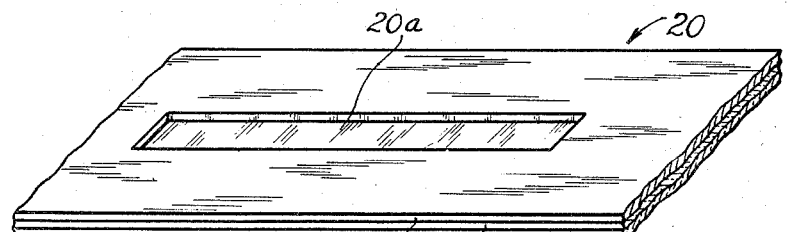
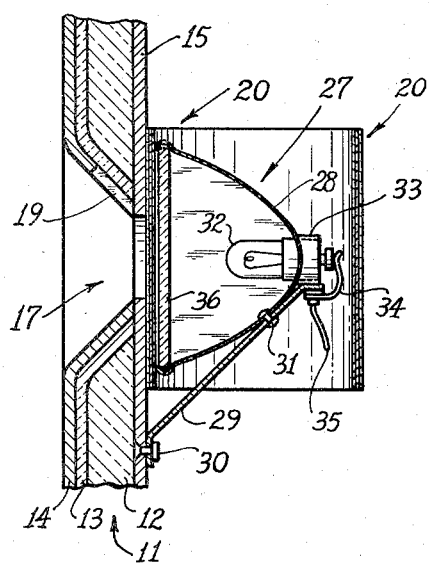
FIG. 4
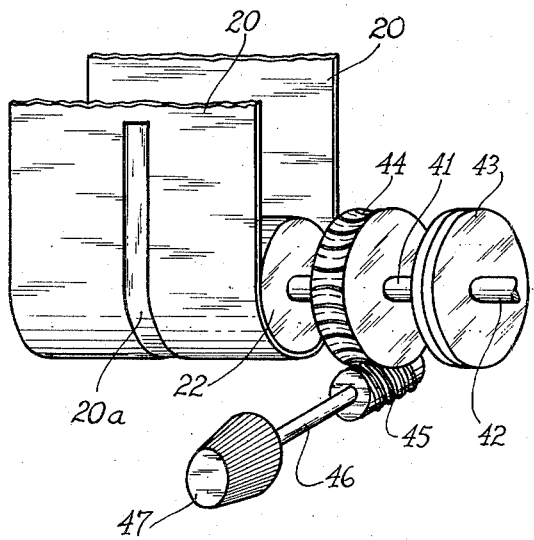
FIG. 6
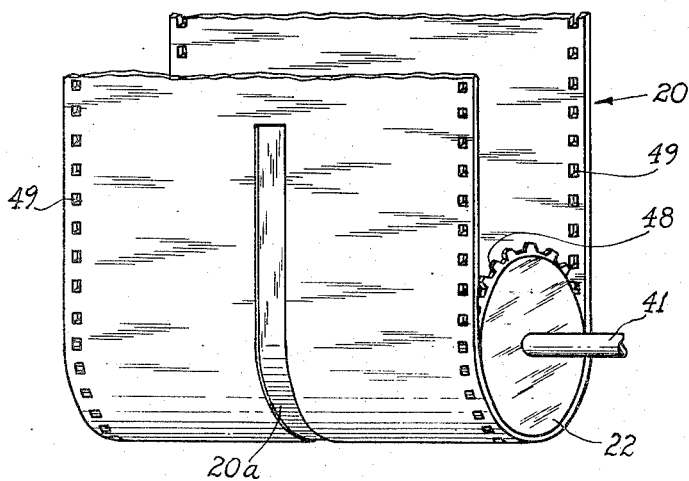
FIG. 7
INVENTOR
EDWIN A. NEUGASS
BY
ATTORNEY Aug. 27, 1957     E. A. NEUGASS     2,804,041
INSTRUMENT INDICATOR
Filed May 27, 1954     4 Sheets-Sheet 3
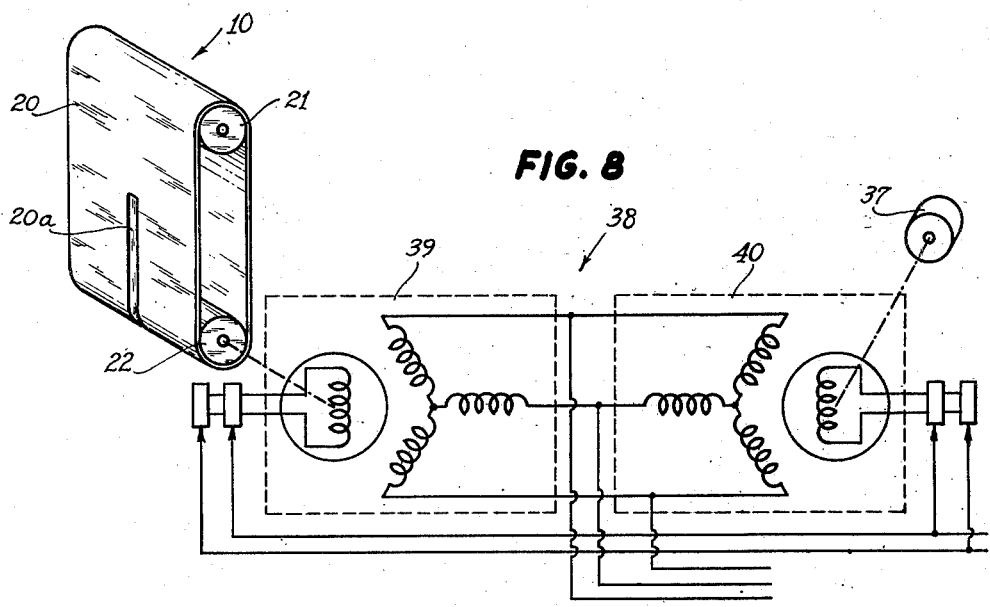
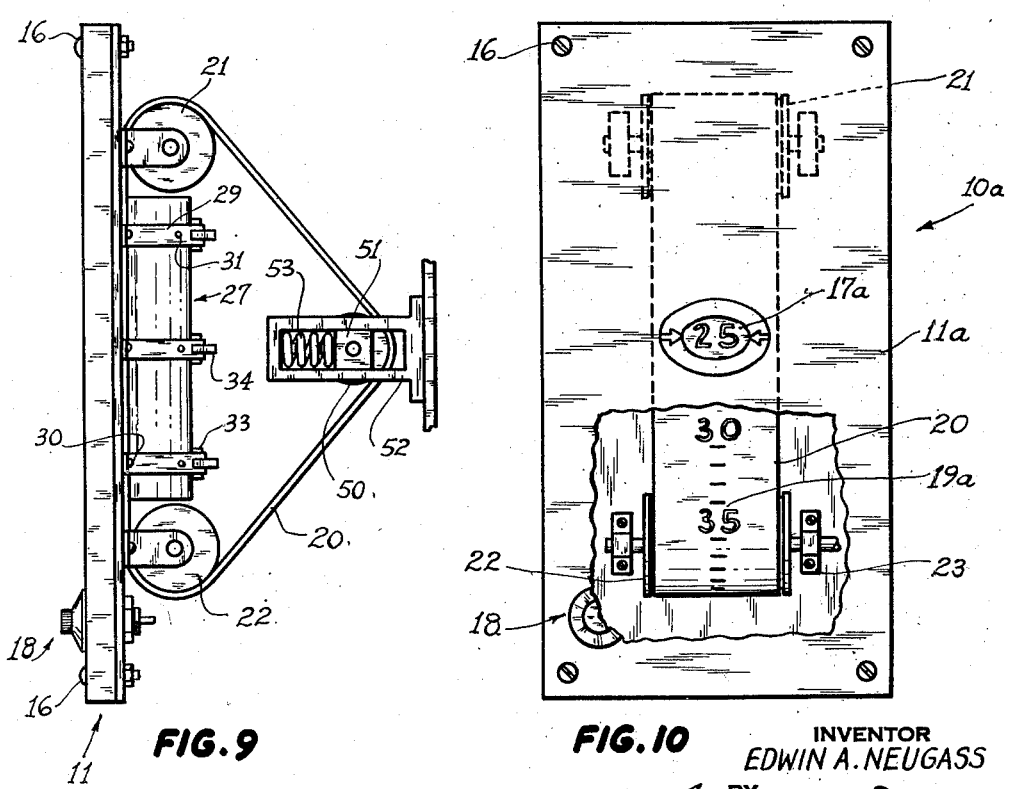
INVENTOR
EDWIN A. NEUGASS
BY
ATTORNEY Aug. 27, 1957　　　E. A. NEUGASS　　　2,804,041
INSTRUMENT INDICATOR
Filed May 27, 1954　　　　　　　　　　4 Sheets-Sheet 4
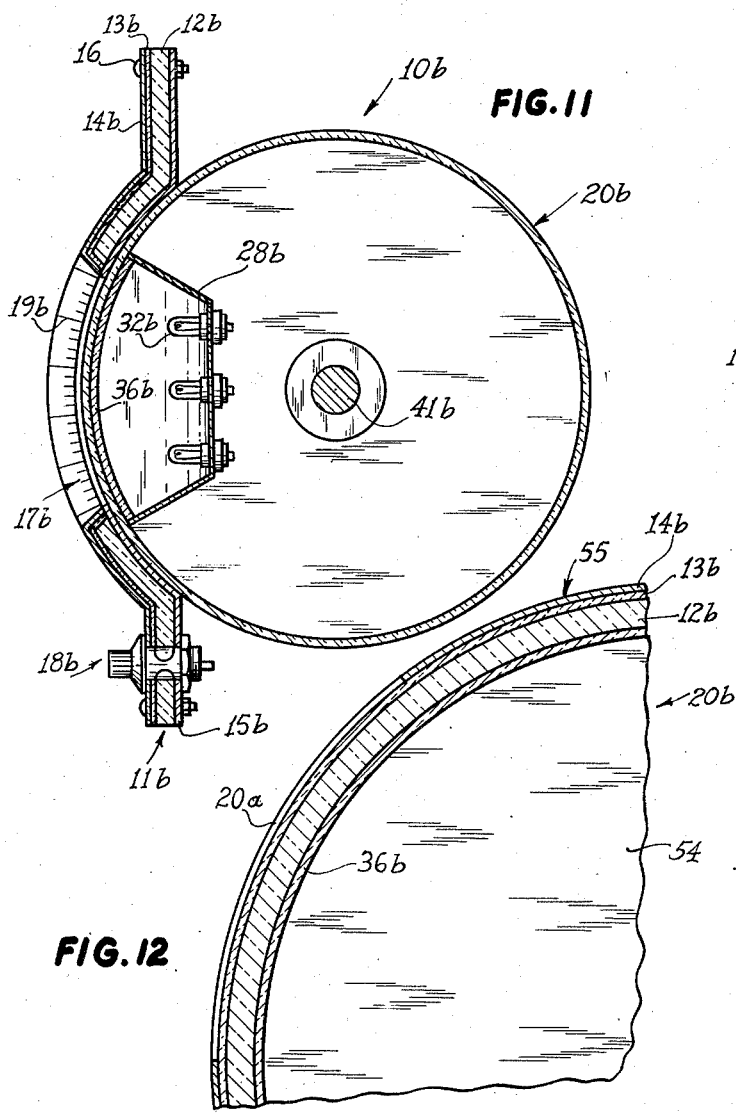
FIG. 11
FIG. 12
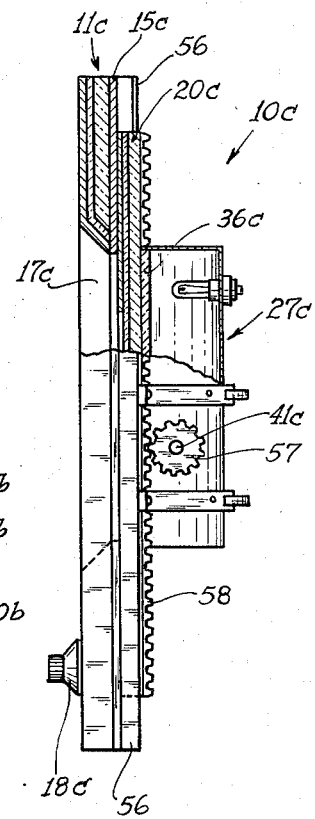
FIG. 13
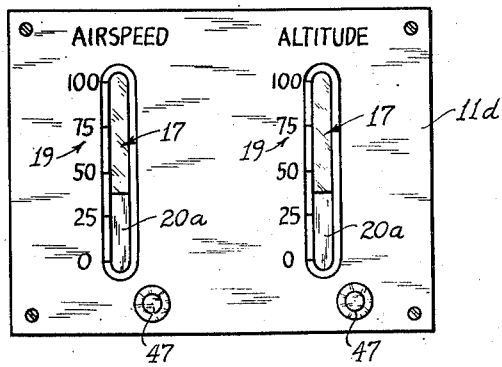
FIG. 14
INVENTOR
EDWIN A. NEUGASS
BY
ATTORNEY

2,804,041

INSTRUMENT INDICATOR

Edwin A. Neugass, Poteau, Okla.

Application May 27, 1954, Serial No. 432,699

15 Claims. (Cl. 116—129)

The present invention relates generally to visual indicators, and is particularly directed to means for visually indicating the conditions sensed by an associated instrument and the like.

Modern technology, in making use of increasingly complex machines, has led to the employment of extensive instrumentation for advising the operator of the performance of the machine or of other conditions which are essential to the safe and reliable operation thereof. However, the information provided by the instruments is of value only if it can be clearly and immediately communicated to the operator and understood by the latter to permit the taking of corrective action without delay when the sensed performance or conditions require such action. As the number of instruments increases, it becomes increasingly difficult for the operator or observer to read the several indications, and this difficulty is particularly acute in modern aircraft instrument installations where the pilot or flight engineer must keep track of instruments indicating the performance of several engines, the condition of parts of the airplane, such as, flaps, landing-gear and the like, as well as the usual flight instruments, such as air speed, altimeter, turn and bank and like indicators. Most of the existing instruments have indicating arrangements which are based upon the ordinary clock in that they include a round dial or face with an arcuate series of numerals thereon and a swinging needle or pointer travelling over the numerals. In order to minimize the inertia of the needle and the extent to which it obstructs viewing of the underlying scale or calibration provided by the numerals, the needles are slender and fragile and must be protected by a cover glass. In reading such an instrument, the viewer must first locate the needle at the center of the instrument face and then follow the needle out to the peripherally located scale. Such reading of the indication afforded by the slender needle is further made difficult by light reflection off the cover glass.

The existing instruments become particularly objectionable when the indications must be read under darkened conditions, for example, during night flying, in that the usual instrument illumination systems, whether from the front or by edge lighting, result in substantial scattered light visible from in front of the instruments, especially from positions to one side or the other of the instruments, and creating a glare which interferes with viewing of the instruments. Further, the scattered light reduces the night vision of the pilot and creates a dangerous condition in that he cannot properly observe the darkened horizon and the like, for example, during landings and takeoffs. The existing illuminated instruments have the additional disadvantage of non-uniform illumination of the needle during swinging of the latter through its complete range of movement, which may be as much as 360°.

Accordingly, an object of the invention is to provide an indicator for association with an instrument to permit accurate and quick reading of the disclosed indication.

Another object is to provide an illuminated instrument indicator which is completely devoid of scattered light to prevent confusion in the reading of the indication.

A further object is to provide an instrument indicator wherein the indication is represented by a straight column moving linearly with respect to a rectilinear scale so that several of such indicators can be arranged side-by-side to permit easy comparison of the several indicators.

In accordance with the present invention, an instrument indicator includes a panel portion having an opening therein, and an indicating member is movable in back of the opening and is visible through the opening as the indicating member is displaced by the associated instrument or the like. The panel portion is edge lighted, while the movable indicating member is illuminated from the rear so that only the scale, calibration or indices thereon are illuminated and scattering of light is completely prevented. Further, the indicating member which is in the form of an endless belt, drum or plate, need not be protected by a cover glass and therefore avoids the undesirable reflections obtained from the cover glasses of existing instrument indicators.

Preferably, the panel opening is elongated and has the scale or calibration along an edge thereof, while the indicating member has an indicating column which is progressively visible through the elongated opening to cooperate with the scale in providing an indication of the displacement or position of the associated instrument.

The foregoing, and other objects, features and advantages of the invention, will be apparent in the following detailed description of illustrated embodiments thereof, particularly when the description is read in connection with the accompanying drawings forming a part thereof, and wherein:

Fig. 3 is a fragmentary perspective view of a belt member included in the embodiment of the invention illustrated in Figs. 1 and 2, but on an enlarged scale;

Fig. 4 is a horizontal, sectional view taken along the line 4—4 of Fig. 2, but on an enlarged scale;

Fig. 6 is a schematic perspective view of a range changing device which can be embodied in an instrument indicator constructed in accordance with the present invention;

Fig. 7 is a fragmentary perspective view of a belt member and driving roll therefor forming parts of another embodiment of this invention;

Fig. 8 is a schematic wiring diagram showing one possible arrangement for driving instrument indicators embodying the present invention;

Fig. 9 is a side elevational view of still another embodiment of the present invention;

Fig. 10 is a front elevational view, partly broken away and in section, of a further modification of an instrument indicator constructed in accordance with the present invention;

Fig. 11 is a vertical sectional view, similar to Fig. 2, but showing still another embodiment of the present invention;

Fig. 12 is a fragmentary sectional view, on an enlarged scale, of a portion of an indicating drum included in the embodiment of Fig. 11;

Fig. 13 is a side elevational view of a still further modification of an instrument indicator embodying this invention; and Fig. 14 is a front elevational view illustrating the manner in which several instrument indicators embodying the present invention may be mounted side-by-side to provide an easily read comparison between the conditions there indicated.

Figure 1:
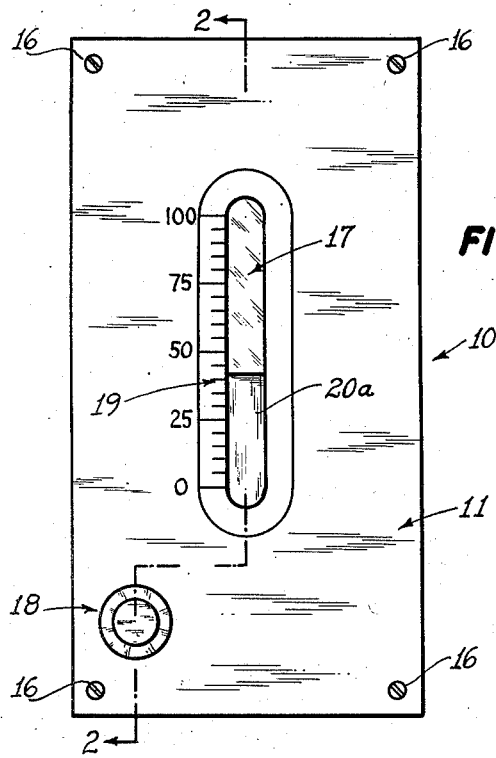
Fig. 1 is a front elevational view of an instrument indicator constructed in accordance with the present invention.

Referring to the drawings in detail, and initially to Figs. 1 to 5, inclusive, thereof, an instrument indicator embodying the present invention is there illustrated and generally identified by the reference numeral 10. The indicator 10 includes a panel, generally identified by the reference numeral 11 which comprises a sheet 12 of clear transparent light-transmitting material, preferably plastic, such as, for example, methyl, methacrylate, having a relatively thin sheet or layer of translucent material, preferably plastic, such as, for example, vinyl, laminated on the front surface thereof. The panel 11 is completed by a layer or sheet 14 of suitably opaque material, preferably plastic, such as, for example, opaque vinyl having a matte finish which is laminated or secured to the outer surface of translucent layer 13. The sheet of light-transmitting material and the layers of translucent and opaque material may be secured together in the manner indicated in United States Letters Patent, 2,518,726, issued August 15, 1950, to Charles N. Shlenker, for an Instrument Panel.

The laminated plastic panel 11 is mounted upon, and backed-up by, a metal supporting panel 15, formed, for example, of aluminum, and the panels 11 and 15 are suitably secured together, for example, by fastening members 16 extending therethrough at the several corners. The panels 11 and 15 are formed with preferably elongated registering openings 17, and the edges of the panel 11, around the opening thereof, are beveled, as shown in Figs. 2 and 4, to permit viewing of the entire opening in panel 15 from positions which are displaced from the perpendicular or normal to the plane of the panels.

A suitable light emitting source is generally identified by the reference numeral 18 and is mounted upon the panels 11 and 15 for the purpose of admitting light to the light-transmitting sheet 12 of the panels 11. A suitable light source is manufactured under part No. A4295, by the Grimes Manufacturing Company of Urbana, Ohio, and is more fully described in the above identified to Charles N. Shlenker. Preferably, such a light source embodies a red filter, so that the light admitted to the transmitting sheet 12 is colored red. Indicia, scales, calibrations and the like, are formed on the front of panel 11 by suitably cutting away portions of the outer opaque layer 14 so as to expose the underlying translucent layer 13. In order to provide suitable contrast for easy reading of the indicia, scales, calibrations and the like, the translucent layer is preferably white, while the outer opaque layer is preferably black thereby providing a sharp color contrast at the exposed areas of the translucent layer, even when the panel is viewed under ambient or natural illumination. As seen in Figs. 1 and 2, the desired scale or calibration 19 is preferably cut or etched in the opaque outer layer 14 covering the beveled part of the panel 11 along the edge of opening 17. When the panel is internally illuminated, by the source 18, the light admitted to the transmitting sheet 12 serves to transilluminate the exposed portion of the translucent layer 13 underlying the cut-away parts of opaque outer layer 14 and thereby provides glare-free and clear illumination of the scale and indicia associated therewith.

In accordance with the present invention, the indication along the scale 19 is provided by an elongated column which is moved in back of the supporting panel 15 to be more or less exposed at the opening 17 in that supporting panel.

Figure 2:
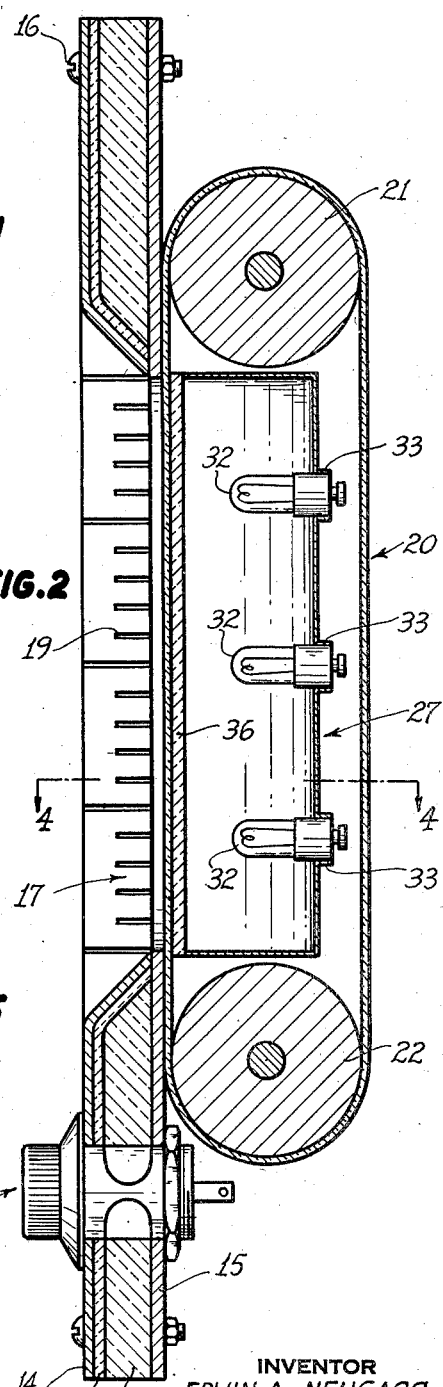
Fig. 2 is a vertical, sectional view taken along the line 2—2 of Fig. 1.
Figure 5:
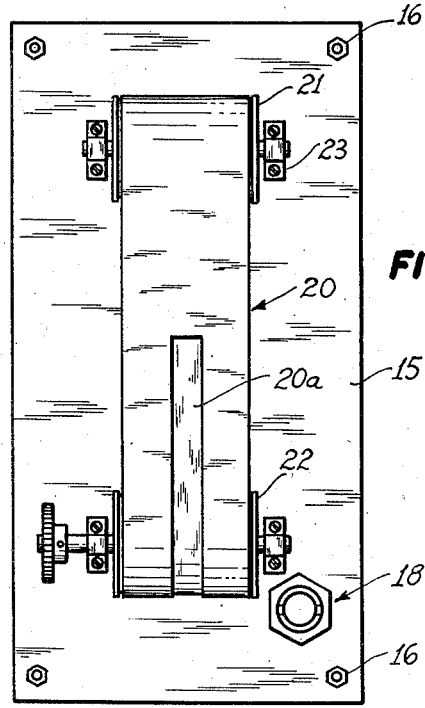
Fig. 5 is a rear elevational view of the instrument indicator illustrated in Fig. 1.

In the embodiment of the invention illustrated in Figs. 1 to 5, inclusive, the indicating column is provided upon an endless belt which is generally identified by the reference numeral 20. As seen in Figs. 2 and 5, the endless belt 20 is trained around upper and lower pulleys or drums 21 and 22 which are rotatably mounted on suitable bearing blocks 23 (Fig. 5) carried by the panel 15 at locations above and below the upper and lower ends, respectively, of the opening 17. The pulleys 21 and 22 are located and dimensioned so that one straight run of the belt 20 therebetween moves along the back surface of supporting panel 15 following a path which covers the opening 17.

As seen in Fig. 3, belt 20 is provided with a column 20a extending along a portion of the length thereof, and the belt 20 is arranged on the pulleys 21 and 22 so that the column 20a is at the outer surface of the belt and is adapted to be more or less exposed at the opening 17 as the belt moves along the closed path around the pulleys 21 and 22.

Preferably, a sharp color contrast is provided between the column 20a of the belt and the remainder of the outer surface of the latter so that the portion of the column exposed at openings 17 will be readily visible. For example, the column 20a may be white, while the remainder of the outer surface of belt 20 is black and has a matte finish to prevent reflection therefrom.

In the embodiment of the invention illustrated in Figs. 1 to 5, inclusive, the flexible, endless belt 20 is in the form of a three-ply lamination and includes a base or backing 24 (Fig. 3) of glass cloth, a layer of white translucent plastic 25, for example, of vinyl, superimposed upon the backing 24, and an outer opaque, black plastic layer 26, for example, also of vinyl, which is superimposed upon the translucent layer 25. It will be seen that the column 20a of such a belt is defined by cutting away a suitably dimensioned strip of the outer opaque layer 26 to expose the underlying portion of the white translucent layer 25. With a belt of the above described character, artificial illumination of the column 20a thereof is achieved by admitting light to the glass cloth backing 24 of the belt to transilluminate the portion of layer 25 which is exposed at the opening of the opaque layer 26 defining the column 20a.

In the illustrated embodiment of the invention, artificial illumination of the belt 20 is achieved by a belt illuminating device, generally identified by the reference numeral 27 (Fig. 2 and Fig. 4), which admits light to the run of the belt immediately behind the supporting panel 15 through the backing 24 of that portion of the belt. The belt illuminating device 27 includes an elongated reflector 28 of parabolic cross-section (Fig. 4) extending parallel to the opening 17 and facing toward the latter or forwardly between the vertical parallel run of the belt 20. The reflector 28 is supported by brackets 29 which are secured, as at 30 and 31, to the supporting panel 15 and the reflector 28, respectively. Several light bulbs 32 are arranged within the reflector 28, and the base of each of the light bulbs is mounted in a spring clamp 33 (Fig. 4) carried by a related one of the brackets 29. Each of the brackets 29 further carries a resilient contact strip 34 which is suitably insulated from the bracket 29 and the related spring clamp 33 and engages the end contact at the center of the light bulb base. The resilient contact strips 34 are connected to "hot" leads 35 of the electric circuit energizing bulbs 32, while the clamps 33 and brackets 29 are connected to ground through the supporting panel 15. The light admitted through the backing 24 of belt 20 is preferably colored red, and, for this purpose, a red filter, in the form of a plate 36 is held between the suitably crimped edges of the reflector 28.

From the foregoing, it is apparent that, under ambient or natural illumination, the column 20a of the belt will appear as a sharply defined white line preferably extending completely across the opening 17 and moving upwardly and downwardly in the latter as the belt 20 is displaced, with the indicia and scale or calibration on the panel 11 similarly appearing as white markings against a black background. Further, that portion of the opening 17 which, at any time, is not exposing the column 20a will be covered by the black outer surface portion of the belt 20. Thus, a clear and sharply defined indication of the condition represented by the position of the belt 20 will be available at all times. When the instrument indicator is artificially illuminated, the column 20a will appear as a red colored line, while red glare-free illumination will also be present at the indicia and scales or calibrations on the panel 11.

The belt 20 is displaced, to vary the indication afforded by the column 20a thereof, by rotation of either one or the other of the pulleys 21 and 22. In the illustrated embodiment 10, the lower pulley 22 is the driven pulley and a suitable transmission is provided between the instrument sensing the condition to be indicated and the driving pulley 22. This transmission may take the form of a direct connection between the shaft of pulley 22 and the shaft of the associated instrument, or, as shown on Fig. 8, the instrument, schematically represented at 37, may be positioned remote from the indicator 10, while an electrical transmission system, generally identified by the reference numeral 38, is provided between the instrument 37 and indicator 10 to communicate the rotational movement of the instrument shaft to the shaft of the pulley 22. The electrical transmission system 38, for example, may include a synchronous motor of the "selsyn" type 39 coupled to the shaft of pulley 22 and a corresponding synchronous generator 40 coupled to the shaft of the instrument 37, with the conventional electrical connection being provided, as shown in Fig. 8 between the motor 39 and generator 40, so that the armatures of the motor and generator will be rotationally locked with respect to each other.

Normally, the parts of the above described indicator will be arranged so that the upper end of the column 20a of belt 20 will reach up to the zero indication on the scale 19 when the associated instrument senses or responds to a condition corresponding to that zero indication. However, in many situations or applications of the indicator 10, it may be desirable to provide for varying the initial or zero position of the column 20a, and an arrangement is schematically illustrated in Fig. 6 for achieving such variation or adjustment. In the embodiment of Fig. 6, the shaft of the driving pulley 22 includes two portions 41 and 42 which are coupled together by a friction clutch 43 so that, when desired, the shaft portion 41 connected to pulley 22 can be adjustably rotated independent of rotation of the shaft portion 42 which is either connected directly to the associated instrument or to a transmission system, such as that shown in Fig. 8. Rotation of shaft portion 41 and pulley 22 for effecting initial adjustment or calibration of the instrument indicator may be effected by a worm gear 44 secured on shaft portion 41 and meshing with a worm 45 carried by a shaft 46 extending forwardly through the panel 11 and carrying an adjusting knob 47 at its forward end.

In order to prevent slipping between the driving pulley 22 and the belt 20, which would disturb the correlation between the position of column 20a and the indication afforded by the associated instruments, the pulley 22, as shown in Fig. 7, may be provided with a series of circumferentially spaced apart teeth 48 engaging in suitable perforations 49 formed along the opposite side edges of the belt 20.

Slipping of the belt with respect to the driving pulley can also be prevented by imposing a suitable tension upon the belt so that the frictional contact between the belt and the driving pulley ensures their conjoint movement. As shown in Fig. 9, the belt 20 may be extended to pass around an idler or tensioning pulley 50 which is resiliently mounted to exert the desired tension upon the belt 20. For example, idler pulley 50 may be rotatably journalled in bearing block 51 which are slidably mounted in suitable guides 52 and are acted upon by springs 53 which urge the axis of rotation of the idler pulley away from the plane containing axes of the pulleys 21 and 22.

In the above description of illustrative embodiments of the invention, it has been assumed that the scale or calibration of the indicator is formed upon the laminated plastic panel 11 along an edge of the elongated opening 17 thereof, and that the indication is provided by the movement of an elongated bar or column 20a along the opening for reference to the scale or calibration. However, as shown in Fig. 10, wherein an instrument indicator 10a embodying the invention is illustrated, the opening 17a of the plastic panel 11a may be relatively small to selectively expose portions of the scale or calibration 19a which is provided upon the belt 20 moving vertically in back of the panel. It is to be understood that the indicator 10a has the panel and belt thereof illuminated in the previously described manner and may be similar in all respects to the previously described embodiments, with the exception of the shape or size of the opening 17a and the location of the scale or calibration.

In all of the above described embodiments the movable portion of the indicator has been provided in the form of a flexible belt traveling around suitably driven pulleys. However, as shown in Figs. 11 and 12 and in Fig. 13, the movable portion of the indicator may be provided in various other forms. Thus, in the instrument indicator 10b of Figs. 11 and 12, the movable indicator is in the form of a drum 20b, and the plastic panel 11b and the supporting panel 15b are bowed outwardly so that the periphery or surface of the drum moves parallel to the panel at least through the portion of the latter having the opening 17b along which the scale or calibration 19b is provided.

The drum 20b is preferably formed with a single, circular end wall 54 which is mounted upon the driven shaft 41b and, at its periphery, supports a cylindrical wall 55 made up, for example, of a three-ply lamination similar to that of the plastic panel 11b. Thus, the cylindrical wall 55 includes an inner layer or sheet 12b of clear, light-transmitting material, a translucent layer 13b superposed upon the outer surface of sheet 12b, and an opaque outer layer 14b which is superposed over the translucent layer. As in the embodiment of Figs. 1 to 5, inclusive, the indicating column or bar 20a is formed on the drum 20b by suitably cutting away a portion of the outer opaque 14b, which corresponds to the opaque outer layer 26 of belt 20, so that the underlying portion of the translucent layer 13b will be exposed. Accordingly, as drum 20b is rotated in response to the action of an associated instrument, the column or bar 20a of the drum longitudinally traverses the opening 17b of the panel and the relationship of the bar or column 20a with respect to the scale or calibration 17b serves to indicate the condition sensed by the associated instrument.

As in the previously described embodiments, the panel 11b and the drum 20b are individually illuminated by a light source 18b and an illuminating device 27b which respectively correspond to the source 18 and device 27 of the embodiment of Figs. 1 to 5. Thus, the illuminating device 27b includes a reflector 28b of parabolic cross-section which is shaped to conform to the arcuate configuration of the cylindrical wall 55 and contain light bulbs 32b. The reflector 28b is supported from the panel 15b by suitable brackets (not shown) extending through the open end of drum 20b, and the reflector further supports a red filter 36b which is disposed adjacent the inner surface of the wall 55.

In the instrument indicator 10c illustrated in Fig. 13, the belt 20 of the embodiment in Figs. 1 to 5 is replaced by an elongated plate 20c which is formed of a three-ply lamination, similar to that of the panel 11, and which is slidably received, at its opposite side edges, in channel guides 56 extending from the back surface of the supporting panel 15c so that the plate 20c is rectilineally movable in back of the supporting panel 15c along a path parallel to the elongated opening 17c formed in the plastic panel 11c and in the metal supporting panel. As in the embodiment of Figs. 11 and 12, the outer opaque layer of the three-ply plastic material making up the plate 20c is cut away to expose the underlying translucent layer and thereby to define the column or bar (not shown) which is movable along the opening 17c to cooperate with the calibration or scale in indicating the sensed condition.

Linear displacement of the plate 20c in the direction parallel to opening 17c is effected by a spur gear 57 mounted upon the drive shaft 41c which is actuated by the associated instrument (not shown) and a gear rack 58 secured upon the rear surface of plate 20c and extending longitudinally along the latter to mesh with the spur gear 57. Thus, rotation of the drive shaft 41c is translated into linear movement of the plate 20c by the meshing gear 57 and rack 58. The plastic panel 11c and the plate 20c are respectively illuminated by a light source 18c and an illuminating device 27c which correspond to the source 18 and device 27 described in connection with embodiment illustrated in Figs. 1 to 5.

As shown in Fig. 14, several instrument indicators embodying the present invention may be provided with a common panel 11d and mounted side-by-side so that the indications represented by the position of the related columns or bars 20a may be instantaneously compared. Thus, indicators for "air speed" and for "altitude" may be mounted in this manner and calibrated with respect to each other, for example, by manipulation of the knob 47 for actuating adjusting mechanism of the kind illustrated in Fig. 6 so that, during a normal take-off, the columns 20a will ascend at the same rate along the opening 17 and, any disparity between the levels of the column, will immediately indicate a deviation from the normal or desired take-off condition. Similarly, indicators embodying the present invention may be disclosed side-by-side to indicate the engine speeds in a multi-engine aircraft, so that any variation among the levels of the related indicating columns will immediately disclose a failure or malfunctioning of the engine speed synchronizing devices. It is further to be noted that an indicator of the described character may be employed, in an aircraft installation, for indicating the movement of an aircraft along a runway, and in that case, the indicator is preferably situated at eye level so that the vertically moving column of the indicator is superimposed upon the runway visible from the cockpit and the pilot can readily check the travel of the aircraft along the runway under conditions of poor visibility.

In all of the described embodiments of the invention, it will be seen that the only light emitted from the instrument indicator is that escaping from the markings representing the calibration or scale and the column or bar of the movable portion of the indicator so that a minimum of red light escapes into the cockpit to disturb, as little as possible, the night vision of the pilot.

While several particular embodiments of the invention have been described in detail and illustrated in the accompanying drawings, it is to be understood that the invention is not limited to these precise embodiments, and that various changes and modifications may be effected therein without departing from the scope or spirit of the invention as defined in the appended claims.

What is claimed is:

1. An indicator comprising a panel member having an aperture therein, an elongated indicating member disposed in back of said panel member, and means supporting said indicating member for movement in the direction of the length thereof along a path which is, at least in part, parallel and adjacent to the back surface of said panel member in the region of said aperture, for exposure at the latter, said panel member and said indicating member each including a sheet of light-transmitting material, a layer of translucent material superposed on the outer surface of said sheet and an opaque outer layer superposed on said translucent layer, one of said members having a scale thereon defined by openings in the related opaque outer layer and the other of said members having an index thereon defined by an opening in the related opaque outer layer; and further comprising means for admitting light to said light-transmitting sheet of said panel member and said indicating member so that the portions of said translucent layers exposed at said openings in the opaque outer layers are transilluminated to provide glare-free illumination of said scale and index.

2. An indicator according to claim 1; wherein said indicating member is continuous and said path is closed.

3. An indicator according to claim 1; wherein said indicating member consists of an endless belt, and said supporting means includes pulleys over which said endless belt is trained to follow a closed path around said pulleys.

4. An indicator according to claim 1; wherein said indicating member is drum shaped.

5. An indicator according to claim 1; wherein said aperture is elongated and said indicating member path runs longitudinally along said elongated aperture, said panel member having said scale thereon along a longitudinal edge of said aperture and said indicating member having said index thereon in the form of an elongated bar extending parallel to said path and laterally aligned with said aperture so that, as said indicating member is displaced along said path, said index bar is progressively exposed at said aperture in reading relationship to said scale.

6. An indicator according to claim 7; wherein said indicating member is endless and said path is closed.

7. An indicator according to claim 1; wherein said opaque and translucent layers are of highly contrasted colors so that said scale and index bar defined by openings in said opaque outer layers are clearly visible when viewed under ambient light.

8. An indicator according to claim 1; wherein said means for admitting light to said light transmitting sheet of the indicating member includes a reflector disposed in back of said indicating member and extending at least throughout the extent of said aperture of the panel member, and a plurality of light sources between said reflector and the back surface of said indicating member, said reflector being arranged to concentrate the light emitted from said sources against the light transmitting sheet forming the back surface of said indicating member.

9. An indicator according to claim 1; wherein said indicating member consists of an endless belt, and said supporting means includes pulleys over which said endless belt is trained to follow a closed path around said pulleys, one of said pulleys being rotatably driven to linearly displace said belt in response to variations in a sensed condition, at least said one pulley having radial teeth spaced along the periphery thereof and said belt having spaced perforations along the length thereof receiving said teeth to prevent relative displacement of said belt and one pulley.

10. An indicator according to claim 1; wherein said indicating member consists of an endless belt, and said supporting means includes pulleys over which said endless belt is trained to follow a closed path around said pulleys, one of said pulleys being rotatably driven to linearly displace said belt in response to variations in a sensed condition, and another of said pulleys being resiliently mounted to tension said belt and thereby to ensure adequate friction between said belt and the driven pulley for preventing relative displacement of the belt and driven pulley.

11. An indicator comprising a panel having an elongated aperture therein and a scale extending along an edge of the aperture, an indicating endless belt having an index bar extending along a portion of the length thereof, pulleys rotatably mounted behind said panel adjacent the opposite ends of said aperture and having said belt trained therearound to follow a closed path including a run along the back of said panel, said index bar being disposed on said belt in lateral registration with said aperture to be progressively exposed at said aperture in reading relationship with said scale during movement along said run, and means for rotationally driving one of said pulleys in response to variations in a sensed condition, said panel and said belt each including a sheet of light transmitting material, a layer of translucent material superposed on the outer surface of said sheet and an opaque outer layer superposed on said translucent layer, said scale and said index bar being defined by suitably shaped openings in the outer opaque layers of said panel and said belt, respectively, and means for admitting light to said light transmitting sheets of said panel and said belt so that the portions of the related translucent layers exposed at said openings in the opaque outer layers are transilluminated to provide glare free illumination of said scale and index bar.

12. An indicator according to claim 11; wherein said means for admitting light to said light transmitting layer of the belt includes an elongated reflector of parabolic cross-section disposed in back of said run of the belt and opening toward the latter, brackets extending from the back of said panel at one side of said run of the belt and supporting said reflector extending at least between the opposite ends of said aperture of the panel, and light bulbs in said reflector supported by said brackets.

13. An indicator according to claim 11; wherein the front face of said panel is bevelled around said aperture so that said belt can be viewed through said aperture from locations displaced laterally with respect to the normal to said panel at said aperture.

14. An indicator comprising a rotatable indicating drum having an index bar extending along a portion of the circumference thereof, a panel in front of the drum having a curved portion concentric with said drum and formed with an elongated aperture extending parallel to said index bar and laterally registered with said bar so that the latter is progressively exposed at said aperture as the drum is rotated in response to variations of a sensed condition, said panel further having a scale along a longitudinal edge of said aperture in reading relationship with the portion of said index bar exposed at said panel aperture, said panel and said drum each including a sheet of light transmitting material, a layer of translucent material superposed on the outer surface of said sheet and an opaque outer layer superposed on said translucent layer, said scale and said index bar being defined by suitably shaped openings in the outer opaque layers of said panel and said drum, respectively, and means for admitting light to said light transmitting sheets of said panel and said drum so that the portions of the related translucent layers exposed at said openings in the opaque outer layers are transilluminated to provide glare free illumination of said scale and index bar.

15. An indicator comprising a panel having an elongated aperture therethrough and a scale extending along a longitudinal edge of the aperture, an elongated plate disposed in back of said panel and having a longitudinally extending index bar along a portion of the front thereof, means slidably mounting said plate in back of said panel for movement parallel to said aperture and with said index bar laterally registered with the aperture so that the index bar is progressively exposed at said aperture in reading relationship to said scale as said plate is displaced relative to said panel, means for displacing said plate relative to said panel in response to variations in a sensed condition, said panel and said plate each including a sheet of light transmitting material, a layer of translucent material superposed on the outer surface of said sheet and an outer opaque layer superposed on said translucent layer, said scale and said index bar being defined by suitably shaped openings in the outer opaque layers of said panel and plate, respectively, and means for admitting light to said light transmitting sheets of said panel and said plate so that the portions of the related translucent layers exposed at said openings in the outer opaque layers are trans-illuminated to provide glare free illumination of said scale and index bar.

References Cited in the file of this patent

UNITED STATES PATENTS

| | | |
|---|---|---|
| 2,058,641 | Slonczewski | Oct. 27, 1936 |
| 2,095,935 | Mitchell | Oct. 12, 1937 |
| 2,118,675 | Jackson | May 24, 1938 |
| 2,146,005 | Bernholz | Feb. 7, 1939 |
| 2,411,597 | Smith | Nov. 26, 1946 |
| 2,477,673 | Weisman | Aug. 2, 1949 |
| 2,518,726 | Shlenker | Aug. 15, 1950 |
| 2,664,648 | Young | Jan. 5, 1954 |

FOREIGN PATENTS

| | | |
|---|---|---|
| 411,713 | Great Britain | June 14, 1934 |